(12) United States Patent
Peschke et al.

(10) Patent No.: US 7,258,490 B2
(45) Date of Patent: Aug. 21, 2007

(54) GASKET UNIT FOR A BEARING BUSHING

(75) Inventors: Harald Peschke, Veitsbronn (DE);
Dieter Jauernig, Herzogenaurach (DE);
Thomas Fickert, Feuchtwangen (DE);
Siegfried Gotz, Hausen (DE)

(73) Assignee: Schaeffler KG, Herzogenaurach (DE)

( * ) Notice: Subject to any disclaimer, the term of this patent is extended or adjusted under 35 U.S.C. 154(b) by 82 days.

(21) Appl. No.: 10/540,452

(22) PCT Filed: Dec. 17, 2003

(86) PCT No.: PCT/EP03/14383

§ 371 (c)(1),
(2), (4) Date: Jun. 22, 2005

(87) PCT Pub. No.: WO2004/065806

PCT Pub. Date: Aug. 5, 2004

(65) Prior Publication Data

US 2006/0125189 A1    Jun. 15, 2006

(30) Foreign Application Priority Data

Jan. 21, 2003    (DE) .............................. 103 02 069

(51) Int. Cl.
*F16C 33/78*    (2006.01)

(52) U.S. Cl. .................. 384/485; 384/486; 384/517

(58) Field of Classification Search ............... 384/517, 384/486, 485, 903, 480
See application file for complete search history.

(56) References Cited

U.S. PATENT DOCUMENTS

| 4,512,672 A | 4/1985 | Olschewski et al. |
| 5,026,324 A | 6/1991 | Schurger et al. |
| 5,199,800 A | 4/1993 | Bauer et al. |
| 6,050,571 A | 4/2000 | Rieder et al. |
| 6,183,369 B1 | 2/2001 | Faulbecker et al. |

FOREIGN PATENT DOCUMENTS

| DE | 29 08 713 | 9/1980 |
| DE | 88 05 833.6 | 9/1988 |
| DE | 38 24 212 | 1/1990 |
| DE | 41 28 179 | 2/1993 |
| DE | 44 08 831 | 9/1995 |
| DE | 196 22 444 | 2/1998 |
| DE | 197 01 461 | 7/1998 |
| DE | 201 11 647 | 11/2001 |

*Primary Examiner*—Lenard A. Footland
(74) *Attorney, Agent, or Firm*—Volpe and Koenig, PC

(57) ABSTRACT

The invention relates to a gasket unit (1) for a journal bearing (2), sealing an annular gap (6) between the bearing bushing (3) and the journal (4). The gasket unit (1) comprises a main seal (8) provided with a front seal (9) arranged in front if it, and a spring washer (10) is inserted between the rollers (5) and the primary seal (8).

14 Claims, 1 Drawing Sheet

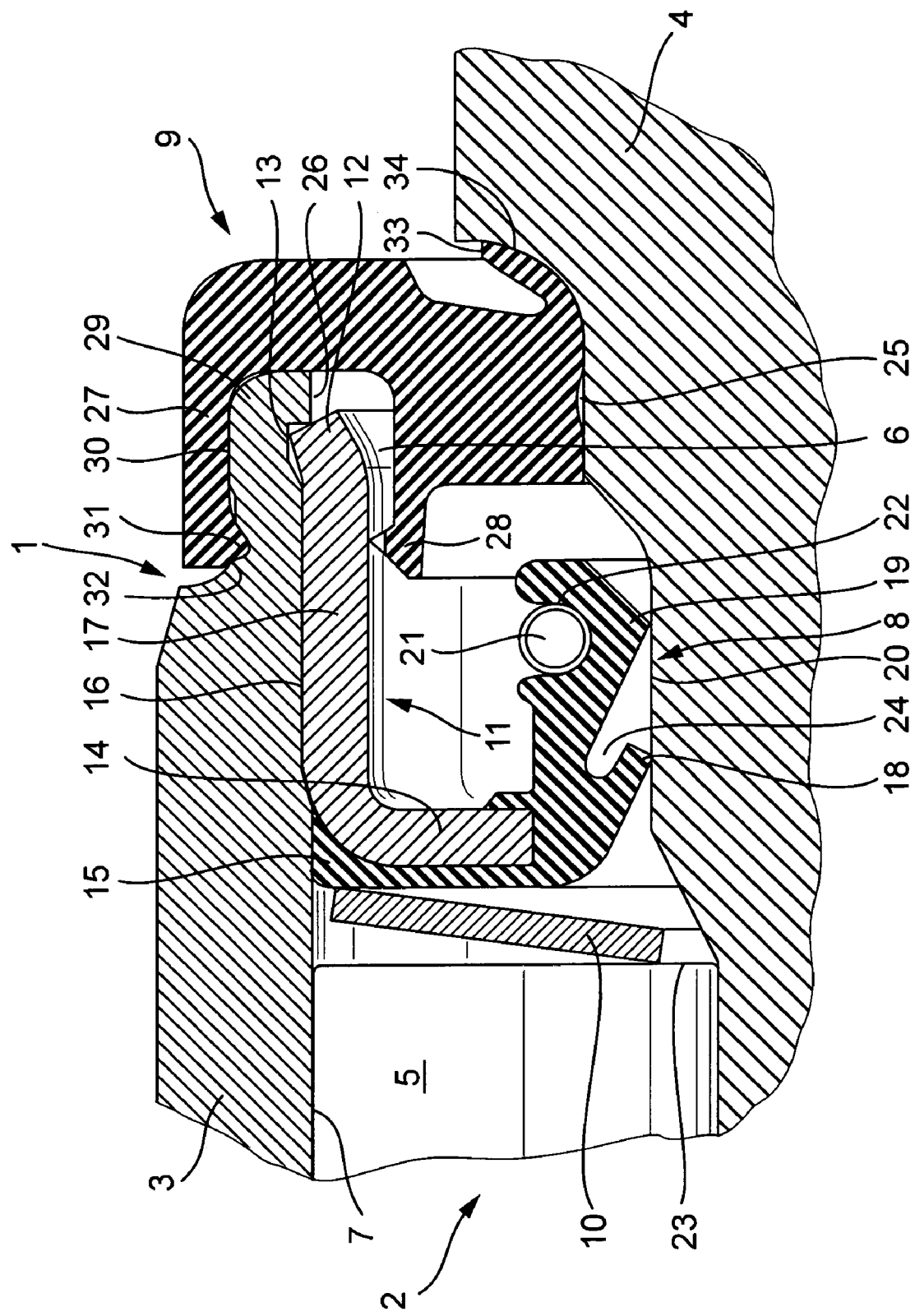

GASKET UNIT FOR A BEARING BUSHING

BACKGROUND

The invention relates to a gasket unit for a rolling bearing supported journal bearing in a bearing bushing. In particular, the gasket unit is provided for bearing bushings used, for example, in the universal joint of a drive shaft. The components provided here are a reinforced main seal, inserted in a fixed manner in a bore of the bearing bushing, and a front seal positioned axially in front of the main seal and connected to the journal in a torque proof manner, and a spring washer arranged between the main seal and the face of the rollers. For this purpose, the main seal is inserted into the bore of the bearing bushing in a friction-locked manner via a cylindrical section of a reinforcement. In the mounting position at least one sealing lip is linked to a blade of the reinforcement, directed radially inward and supported at the journal in a sealing manner. The front seal covers an annular gap formed between the bearing bushing and the journal in the mounting position. The spring washer, also provided in the gasket unit, is supported on the outside at the reinforcement of the main seal and on the inside at the face of the rolls.

A gasket unit is known from DE 44 08 831 A1, which, in addition to the above-mentioned individual components, such as main seal, front seal, and spring washer, also comprises an intermediate seal. Said seal is provided with a reinforcement, which is supported at its face on the bearing bushing and with its interior cylindrical blade being extrusion-coated by the insulating material of the intermediate seal. The exterior cylindrical blade of the reinforcement has a tolerance and engages an annular gap of the front seal. A disadvantage in this known gasket unit is that it enlarges the axial construction space and requires a more complex mounting expense.

SUMMARY

The present invention is based on the objective of providing a gasket unit with a reduced volume requirement for its components, provided with a reduced wear of the sealing lip and the sealing effect being optimized with respect to the discharge of lubricants and/or the entry of contaminants.

This objective is attained in the main seal being provided with a reinforcement facing with its end in a direction of the opening of the bearing bushing, bent on the outside and supported on the interior wall of the bearing bushings. This measure ensures an advantageously positioned arrangement of the main seal in the bearing bushing. Connected thereto, a defined axial support force of the spring washer develops, which is allocated between the main seal and the rollers of the journal bearing. Furthermore, the mounted position of the main seal according to the invention ensures that the sealing lip corresponding to the main seal is located in a defined mounting position at the outer surface of the journal. According to the invention the main seal comprises two axially distanced sealing lips, sealingly supported concurrently at a section of the journal and having the same diameter. An increased support force of the sealing lip allocated to the front seal is achieved by way of a tubular spring inserted in an exterior circumferential groove of the sealing lip and pressing it to the journal with an enhanced radial force. The exterior of the front seal, arranged in a torque-proof manner on the journal, is located in a form-fitting manner to a radially separated end section of the bearing bushing, with the combination of these components forming a labyrinth seal. Furthermore, in the mounted position the front seal comprises a sealing lip allocated to the inside of the reinforcement of the main seal.

The measures according to the invention advantageously reduce the wear of the sealing lips and simultaneously improve the sealing effect of the gasket unit regarding the discharge of lubricants, which directly influences bearing life negatively. The invention is further characterized by an advantageously low axial pre-tension of the rollers due to a relaxation of the elastomer seal, i.e., the material of the main seal. In an advantageous manner, the spring washer according to the invention, arranged between the main seal and the rollers, is almost directly supported on the outside of the reinforcement of the main seal, so that a tightly toleranced axial force and/or front tension of the rolling bearing can develop in connection with the defined mounted position of the main seal. Further, the structure of the gasket unit according to the invention comprising three components offers an advantageous assembly because these components allow an automated, or at least semi-automated, assembly which simultaneously results in an advantage in costs.

The gasket unit according to the invention includes a circularly formed, largely dimensioned intermediate space located between the main seal and the front seal. This space can advantageously be used as a reservoir for lubricants and allows lubrication of the journal bearing for life.

Further additional embodiments of the invention are the subject of dependent claims 2 through 14.

In an advantageous manner the reinforcement of the main seal is engaged with its end in an annular groove of the bearing bushing in order to achieve a defined position. In the area of the cylindrical section of the reinforcement it is suggested alternatively to provide a circumferential penetration and/or circumferentially distributed, radially outward facing burls, which engage an annular gap at the interior wall of the bearing bushing in a form-fitting manner.

Furthermore, the reinforcement of the main seal according to the invention is provided at its end facing the rolls with a radially inwardly facing circumferential flange, which is coated by the elastic seal material of the main seal at least at the side of the rolls. Further, the two sealing lips supported on the bearing journal are connected to the elastic seal material enclosing the free end of the inwardly facing flange. The seal material covering the flange of the reinforcement on the outside additionally extends at its face radially beyond the sleeve surface of the cylindrical section of the reinforcement. This measure causes to seal a sealing gap developing between the reinforcement and the interior wall of the bearing bushing. The amount of protruding material, resulting in the difference between the exterior diameter of the reinforcement and the exterior diameter of the flange, coated by the seal material at the exterior, causes a desired friction-locked contact of the seal material at the interior wall of the bearing bushing in the mounted state.

The main seal according to the invention comprises two differently designed sealing lips. The first one, facing the front seal, at its exterior enclosed by the tubular spring, is provided with a triangular profile with the sealing lip that, in the mounted state, is supported on the outer surface of the journal at the triangular tip. The other sealing lip has a primarily rectangularly designed profile. Based on the angled arrangement of the sealing lip in the direction of the opening of the bearing bushing, the sealing lip is supported on the journal via an edge support.

The mounted state of the sealing lips, i.e. the largely symmetrical arrangement of the triangular frontal sealing lip and the diagonally arranged additional sealing lip causes a diagonally extending gap between the sealing lips with a rounded gap end. The gap allows the desired high elasticity and/or the independent support of the sealing lips on the sleeve surface of the journal. Furthermore, this gap simultaneously forms another desired reservoir for the lubricant of the journal bearing.

The front seal according to the invention, made exclusively from an elastic material is arranged on the journal in a torque-proof manner. For this purpose, the journal is advantageously cascaded so that the front seal is positioned at a section of the journal that has a greater diameter than the section on which the sealing lips of the main seal are supported.

The design of the front seal comprises an axially designed, U-shaped part, which the radially cascading end section of the bearing bushing engages. The seat of the front seal is limited on the outside by a rim and on the inside by the sealing lip of the front seal.

In order to form a labyrinth seal, the rim of the front seal forms on its end a radially inwardly facing projection, which in the mounted state engages in a form-fitting manner an annular gap of the bearing bushing, which is radially cascading in its end section.

Another embodiment of the front seal provides for the sealing lip to be supported in a form-fitting manner at the reinforcement of the main seal in the mounted state. Due to the fact that the section of the reinforcement, with its end facing radially outward, forms a conically shaped integrated diagonal area, the assembly of the front seal is facilitated. The integrated diagonal area allows the sealing lip to assume the mounting position without any trouble. The particular purpose of the sealing lip of the front seal is to prevent negative influences on the journal bearing, such as the entry of contaminants or moisture into the interior chamber of the bearing bushing.

For bearing bushings to be provided with secondary lubrication it is suggested to provide the sealing lip with at least one front groove, axially extending in the area of the contact zone. If necessary, the front seal may be provided with several grooves distributed over the circumference, in order to avoid a closed, line-contacting support of the front seal on the reinforcement of the main seal.

The embodiment of the front seal, provided with a circular shape, further provides that it includes an axial rim on a side facing away from the main seal, in the mounted position of the device supported in a friction-locked manner on a shoulder of the journal. This measure improves the seal of the front seal in reference to the journal and thus avoids any discharge of lubricants from the bearing bushing and/or the entry of any contaminants via the sealing gap developing between the front seal and the journal. In order to achieve a spatially optimized design of the front seal, said seal is provided with an exterior diameter equivalent to or smaller than an exterior diameter of the bearing bushing.

BRIEF DESCRIPTION OF THE DRAWING

The invention is explained in the following detailed description on the basis of a single FIGURE showing an exemplary embodiment of said invention.

DETAILED DESCRIPTION OF THE PREFERRED EMBODIMENT

The FIGURE shows the construction of a gasket unit 1 according to the invention provided for a journal bearing 2. Here, a bearing bushing 3 is provided, in which a journal 4 is supported via rollers 5. The bearing bushing 3, provided in a cup-shaped design, extends axially over the rollers 5 and forms an annular gap 6 limited radially outwardly by an interior wall 7 of the bearing bushing 3 and radially inwardly by the journal 4. The gasket unit 1, which serves to seal the annular gap 6, comprises the components of the main seal 8, the front seal 9, and the spring washer 10. In the mounted state the main seal 8 is formed by a reinforcement 11, with its cylindrical section being supported at the interior wall 7 of the bearing bushing 3 in a friction-locked manner. At the end facing the front seal 9 the reinforcement 11 is provided with a radially outwardly facing section 12, engaged in a annular gap 13 of the bearing bushing 3 in a form-fitting manner and, thus ensuring a defined positioning of the main seal 8.

A predetermined axial front tension of the rollers 5 is caused by the spring washer 10, which is supported on the inside on a face 23 of the rollers 5 and on the outside on the seal material 15 and, thus, indirectly on the flange 14 of the reinforcement 11. At the end facing the spring washer 10 the reinforcement 11 forms a radially inwardly facing flange 14, which is coated with an elastic seal material 15 over its entire surface on the side facing the spring washer. Here, the seal material 15 extends, limited at the outside radially via the exterior diameter of the reinforcement 11, and thus causes a sealing gap 16 between the interior wall 7 and the cylindrical section 17 of the reinforcement 11. At the free end of the flange 14, the main seal 8 is provided with two axially spaced apart sealing lips 18, 19 contacting a section 20 having the same diameter as the journal 4 in a sealing and friction-locked manner. The sealing lip 19 at the end has a triangular cross-sectional profile, which in the mounted position is supported largely symmetrically oriented contacting the section 20 of the journal 4 at a line. In order to achieve an enhanced contact pressure, the sealing lip 19 is enclosed on the outside by a tubular spring 21, which is inserted into an annular gap 22 of the sealing lip 19. The other sealing lip 18 is oriented at an angle diagonally starting from the flange 14 in a direction of the symmetry axis of the journal 4, and forms a rectangular cross-sectional profile, supported with its exterior edge on the section 20 of the journal 4.

Between the sealing lips 18, 19 a diagonally extending groove 24 is formed, having a rounded end. The groove 24 improves, on the one hand, a desired elasticity of the sealing lips 18, 19 and thus any separate effectiveness. Furthermore, the groove 24 can be used as a reservoir for lubricants for the journal bearing 2.

The front seal 9 is made exclusively from a seal material and is arranged in a friction-locked manner on the section 25 of the journal 4, in an area where its diameter exceeds the diameter of the section 20. The front seal 9 forms an axially oriented recess 26 facing in a direction of the bearing bushing 3. Radially on the outside, the recess 26 is limited by the rim 27 and on the inside by the sealing lip 28. An end section 29 of the bearing bushing 3 is fitted into the recess 26 of the front seal 9, with the rim 27 of the front seal 9 contacting an exterior surface of the end section 29 in a non-positive manner. In order to form a labyrinth seal 30 between the end section 29 and the rim 27 of the front seal 9, on the inside of the free end of the rim 27 a radially inwardly facing projection 31 is provided, which engages a circumferential groove 32 of the end section 29.

The sealing lip 28 of the front seal 9 is allocated to the reinforcement 11 of the main seal 8. In order to facilitate later lubrication of the journal bearing 2, the sealing lip 28 is provided with at least one axially extending groove 37 in the area of the contact zone 36, allowing a simplified entry of the lubricant into a space 35 located axially between the front seal 9 and the main seal 8, which can be used as a reservoir for lubricants. The section 12 of the reinforcement 11, extending with its end radially outward at an angle, allows a destruction-free assembly of the front seal 9 and the corresponding sealing lip 28. The front seal 9 also comprises a rim 33 on the side opposite the main seal 8, which in the mounted state is supported on a shoulder 34 of the journal 4 in a friction-locked manner and, thus, sealing.

LIST OF REFERENCE CHARACTERS

1 Gasket unit
2 Journal bearing
3 Bearing bushing
4 Journal
5 Roller
6 Annular gap
7 Interior wall
8 Main seal
9 Front seal
10 Spring washer
11 Reinforcement
12 Section
13 Annular gap
14 Flange
15 Seal material
16 Sealing gap
17 Section
18 Sealing lip
19 Sealing lip
20 Section
21 Tubular spring
22 Annular gap
23 Face
24 Groove
25 Section
26 Recess
27 Rim
28 Sealing lip
29 End section
30 Labyrinth seal
31 Projection
32 Circumferential groove
33 Rim
34 Shoulder

The invention claimed is:

1. A gasket unit for a rolling bearing supported journal bearing inside a bearing bushing, comprising a reinforced main seal inserted into a bore of the bearing bushing in a torque-proof manner, a front seal axially positioned in front of the main seal, connected in a torque-proof manner to the journal, and a spring washer arranged between the main seal and a face of rollers of the bearing, the main seal being pressed in a friction-locked manner via a cylindrical section of a reinforcement into the bore at an interior wall of the bearing bushing and comprising at least one sealing lip, being provided on a radially inwardly facing flange of the reinforcement, said sealing lip is supported on the journal in a sealing manner;

the front seal covering an annular gap between the bearing bushing and the journal;

the spring washer being supported on an outside thereof on an area of the reinforcement of the main seal that is coated with a seal material, and on an inside on the face of the rollers, wherein in a mounted state the main seal is positioned via an angled end section of the reinforcement supported on an interior wall of the bearing bushing, and the main seal includes two axially spaced apart sealing lips, which are sealingly supported on a section of the journal and have a same diameter as the journal, with the first sealing lip facing the front seal having located on an outside thereof a tubular spring, and the front seal, connected in a form-fitting manner with the bearing bushing in an area of a radially separated end section, forming a labyrinth seal, includes a sealing lip, which is located inside of the reinforcement of the main seal.

2. A gasket unit according to claim 1, wherein the section at the end of the reinforcement engages in a form-fitting manner an annular groove of the bearing bushing.

3. A gasket unit according to claim 1, wherein a roller side of the radially inwardly facing flange of the reinforcement (11), is coated with an elastic seal material on a side facing the spring washer.

4. A gasket unit according to claim 3, wherein the seal material covering the face of the flange radially extends over an exterior contour of a cylindrical section of the reinforcement, and thus seals a sealing gap in a mounted position of the main seal, located between the interior wall of the bearing bushing and the cylindrical section of the reinforcement.

5. A gasket unit according to claim 1, wherein the first sealing lip of the main seal enclosed by the tubular spring is provided with a triangular cross-sectional profile and the corresponding second sealing lip has a rectangular profile.

6. A gasket unit according to claim 5, wherein the sealing lips are separated by a diagonally extending groove having a rounded end.

7. A gasket unit according to claim 6, wherein the groove is provided as a reservoir of lubricants for the journal bearing.

8. A gasket unit according to claim 1, wherein the front seal is made exclusively from a seal material and/or from an elastic material, and is positioned at a section of the journal having a greater diameter than the section of the journal on which the sealing lips are supported.

9. A gasket unit according to claim 8, wherein the sealing lip of the front seal is supported in a non-positive manner at an inside of the reinforcement of the main seal.

10. A gasket unit according to claim 9, wherein the sealing lip of the front seal is provided with at least one axially extending groove in an area of a contact zone.

11. A gasket unit according to claim 8, wherein the front seal includes an axial rim on a side opposite the main seal, said rim is supported in a mounted state on a shoulder of the journal.

12. A gasket unit according to claim 8, wherein an outside diameter of the bearing bushing is identical or larger than an outside diameter of the front seal.

13. A gasket unit according to claim 1, wherein in a mounted position, a radially separated end section of the bearing bushing engages an axially oriented, U-shaped recess of the front seal, which includes an outside rim and an inside sealing lip.

14. A gasket unit according to claim 13, wherein the front seal is provided at an end of the rim with a radially inwardly facing projection that engages a circumferential groove of the end section of the bearing bushing.

* * * * *